United States Patent [19]

Huber et al.

[11] Patent Number: 4,844,336

[45] Date of Patent: Jul. 4, 1989

[54] HEATED ROLL-OFF CONTAINER

[75] Inventors: William J. Huber, Audubon; Charles V. Welsh, Lansdale, both of Pa.

[73] Assignee: Florig Equipment Company, Inc., Conshohocken, Pa.

[21] Appl. No.: 55,464

[22] Filed: May 29, 1987

[51] Int. Cl.⁴ ............................................... B60H 1/02
[52] U.S. Cl. ............................... 237/12.3 R; 298/1 H; 237/12.3 C
[58] Field of Search ................... 432/121; 237/12.3 R, 237/12.3 C; 298/1 H

[56] References Cited

U.S. PATENT DOCUMENTS 2,974,997  3/1961  Parsley et al. .......................... 296/28
3,472,548 10/1969  Comisac ................................. 296/28
4,623,197 11/1986  Stluka ..................................... 298/10

FOREIGN PATENT DOCUMENTS 0746737  3/1956  United Kingdom .
778255  7/1957  United Kingdom ............... 298/1 H Primary Examiner—Henry A. Bennet
Attorney, Agent, or Firm—Volpe and Koenig

[57] ABSTRACT

A roll-off container in combination with a tilt bed truck which incorporates apparatus for heating the container side walls and bottom of the container with truck exhaust to prevent freezing during inclement weather. The connection between the container and a truck exhaust is made and broken automatically during normal loading and unloading operations of the roll-off container and tilt bed truck.

24 Claims, 8 Drawing Sheets

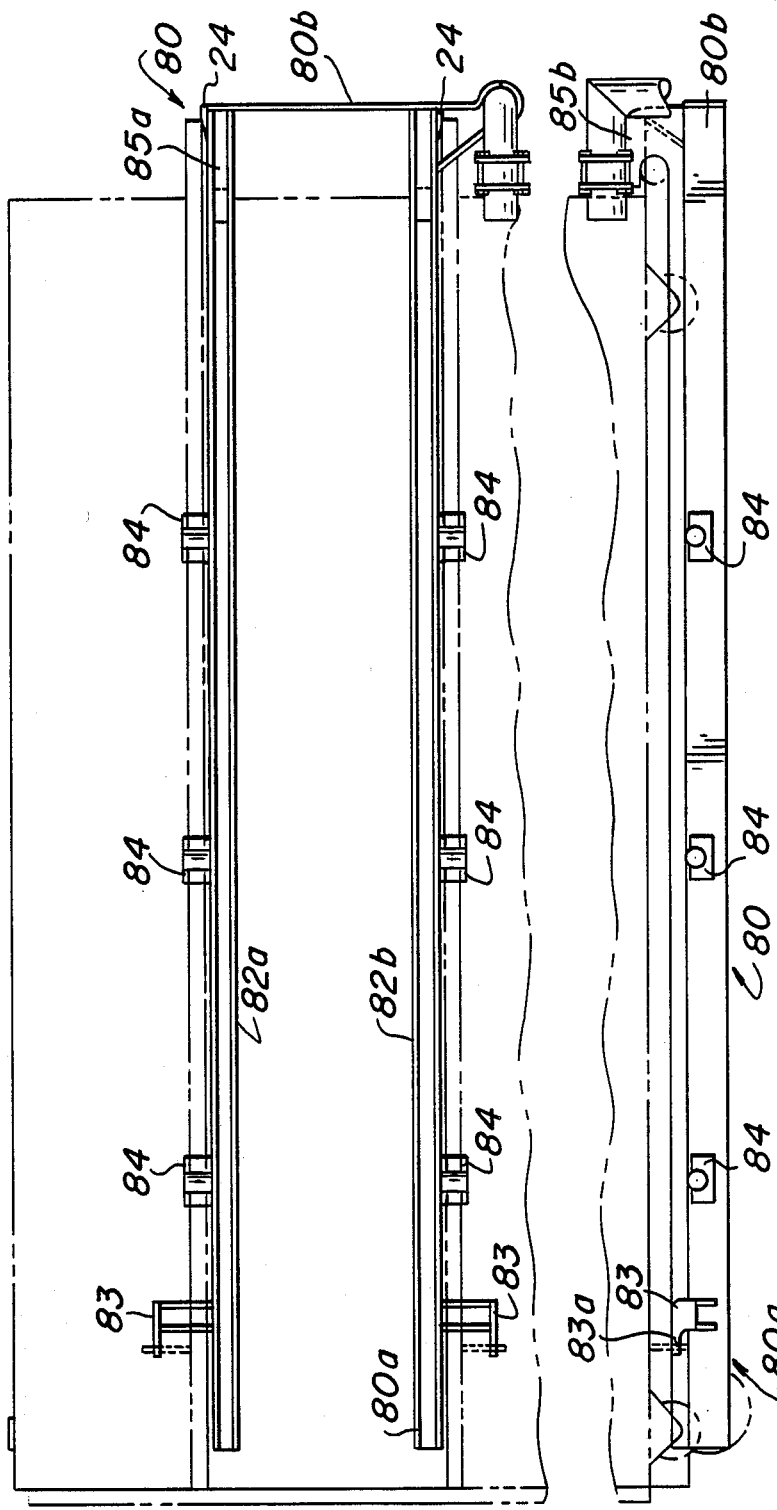

HEATED ROLL-OFF CONTAINER

BACKGROUND OF THE INVENTION

Roll-off containers are often used in the collection and transportation of residential, commercial and industrial refuse such as at construction sites and for the transportation of fly ash and the like. Roll-off containers are typically employed with a tilt bed truck in which the container is loaded onto the truck by tilting the bed and winching of the container onto the bed as the bed is lowered. In some cases, a hydraulic cylinder is employed in place of a winch. Rollers at the container corners and along the tilt bed guide rails ease loading of the container onto the tilt bed. The container bottom typically includes guide rails to interact with the guide rails and rollers on the truck bed which align the container with the truck bed during loading. Such containers are typically open-topped to ease top loading. The containers include a rear door which is opened to allow dumping of the refuse or fly ash after transportation. Because of the open top often the refuse in the container becomes wet and during cold weather can freeze. When such containers are employed to transport fly ash, in cold weather freezing of the moist fly ash is common. Dumping of a container holding frozen refuse or fly ash is difficult or impossible.

The use of hot exhaust gases from a tractor to heat a refuse trailer is shown in U.S. Pat. No. 4,623,197 owned by a common assignee as the present application. In U.S. Pat. No. 4,623,197, a refuse trailer is provided which includes an exhaust nipple and a duct system to allow heating of the trailer by the tractor exhaust. However, in the use of roll-off containers, it has heretofore been unknown to provide heat from the truck exhaust to the roll-off container due to the difficulty of making a connection between the truck exhaust and the roll-off container. The motion of the container in both vertical and horizontal directions during loading and unloading makes convenient and secure connecting of the truck exhaust to the roll-off container unknown in the prior art.

SUMMARY OF THE INVENTION

The present invention provides an apparatus and means for automatically and securely interconnecting a tilt bed truck exhaust to a roll-off container having a load heating duct system. The present invention provides a transfer pipe mounted on the tilting bed of the truck having a first spring-loaded end adapted to interconnect with an exhaust diverter valve when the tilt bed is lowered and a second spring-loaded end adapted to interconnect with a duct fitting on a roll-off container as the roll-off container is loaded. Sure interconnections are provided by spring-loaded expansion joints at both interconnections and by providing the tilt bed frame and roll-off container with precision alignment means. The present invention provides for the alignment and interconnection in both the horizontal and vertical planes required in providing a roll-off container with heat from a truck exhaust.

The present invention is particularly well suited for the transportation of moist fly ash in cold weather. Fly ash is often moist and warm when it is loaded, being a by-product of combustion. In cold weather, the moisture trapped in the fly ash tends to freeze making dumping of the material difficult or impossible. The present invention allows for heating of the fly ash in the container with a truck's exhaust to facilitate dumping. The roll-off container of the present invention, in addition to appropriate duct works for heating also preferably includes a water tight rear door, front and rear splash guards for the open container top and a cover guard to shield the container cover.

BRIEF DESCRIPTION OF THE DRAWING

FIG. 6 is top plan view of a truck tilt bed according to the present invention.

FIG. 7 is an elevational view of a truck tilt bed according to the present invention.

DESCRIPTION OF THE PREFERRED EMBODIMENT

Figure 1:
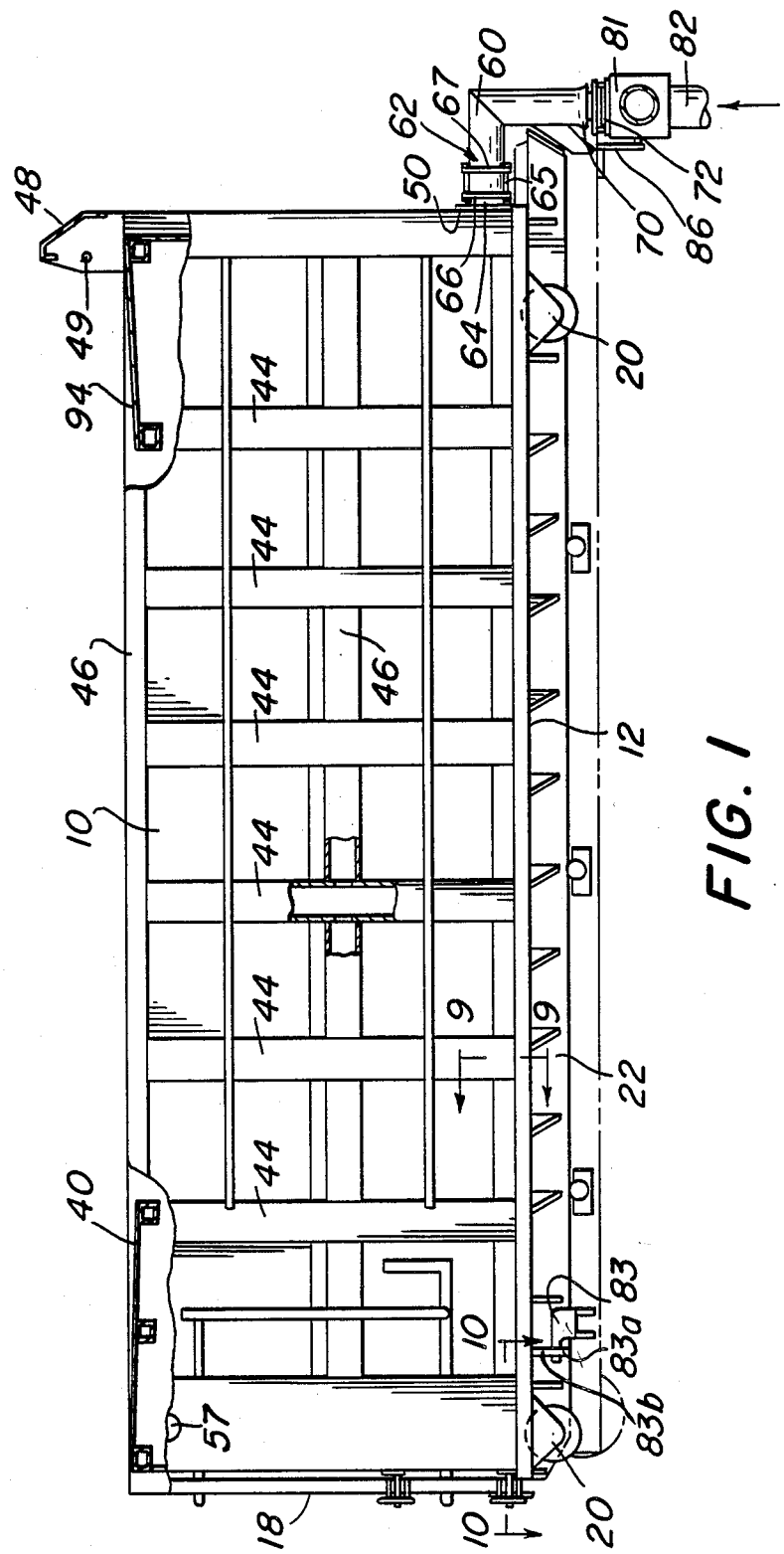
FIG. 1 is a side elevation of a roll-off container, partially cut away according to the present invention.

With reference to FIG. 1, there is shown a side elevational view of a roll-off container in accordance with the present invention. The container 10 is adapted to be carried by a tilt bed truck, not shown, of a type well known in the art.

Figure 3:
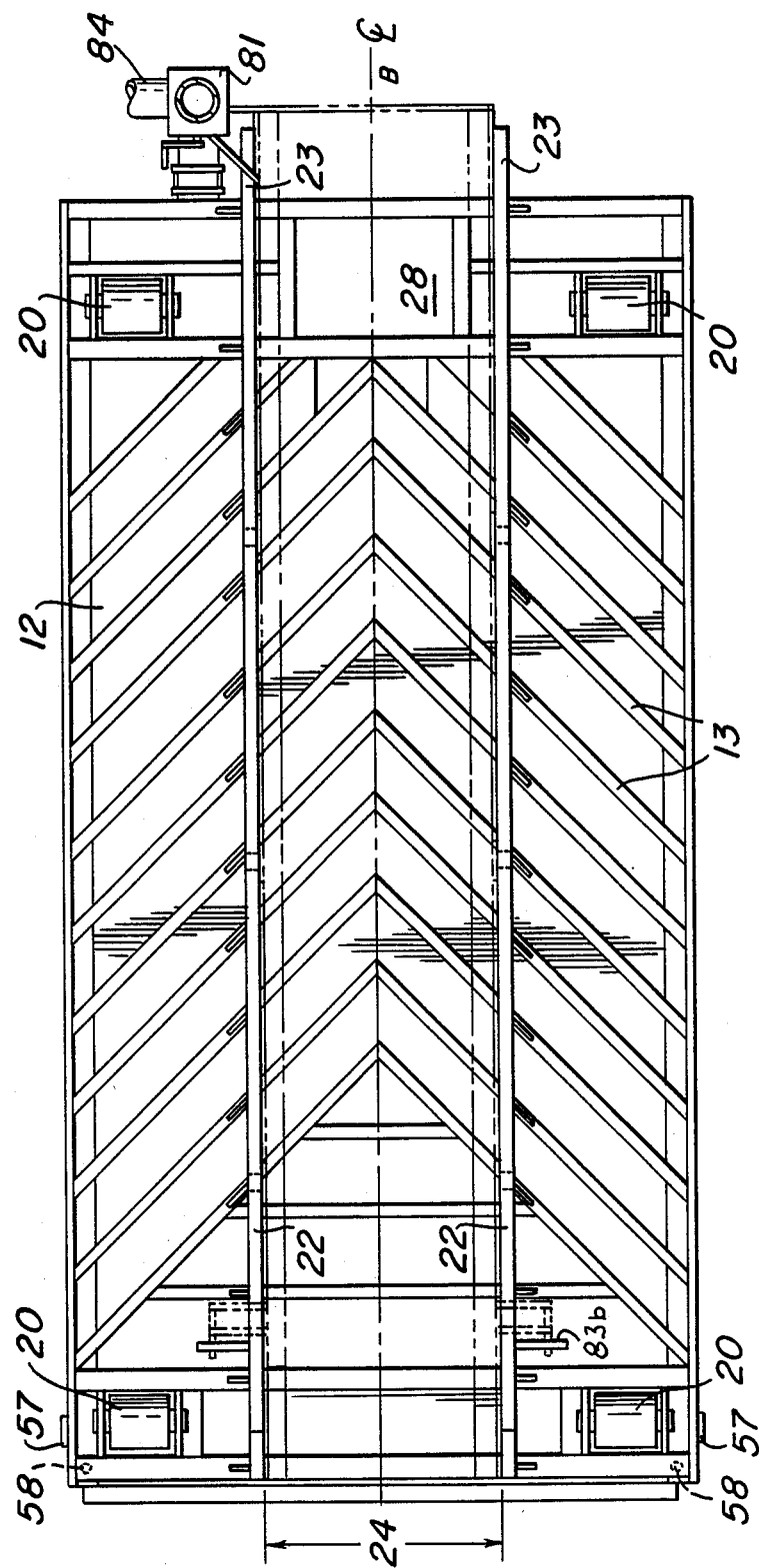
FIG. 3 is a bottom plan view, of a roll-off container according to the present invention.

The container 10 is typically a rectangular box shape having a bottom 12, vertical side walls 14a and 14b, a vertical front wall 16 and a rear door 18. Typically, such containers are opened top however, a hinged or removable top may be included if desired. If a top is included, a hatch may be provided for loading. Some containers include a permanent top and are loaded through a tailgate or an opening in a tailgate. Mounted at each corner of the bottom 12 are rollers 20 all having their axis of rotation oriented perpendicular to the longitudinal center line B of the container 10, FIG. 3. The rollers 20 support the container 10 when it is sitting on the ground and facilitate movement of the container 10 during loading and unloading operations. Also oriented on the bottom 12 of container 10 are parallel guide rails 22. The guide rails 22 are oriented parallel to and spaced equidistant from the longitudinal center line B of container 10. Generally accepted industry standards provide for the space 24 between guide rails 22 to be 36.5 inches, and the width of the tilt bed frame 80 to be 35.5 inches so that guide rails 22 engage frame 80 with about a ½ inch clearance on each side. The clearance eases initial alignment of the tilt bed frame 80 and guide rails 22 during loading.

Guide rails 22 on container 10 are adapted to engage the tilt bed frame 80, FIGS. 6 and 7. The relationship of guide rails 22 and container 10 is such as to form a sled-like device as will be known to those skilled in the art. The tilt bed frame 80 as shown in FIGS. 6 and 7 comprises two parallel rails 82a and 82b oriented longitudinally along a truck and adapted to be raised and lowered in a tilting motion by hydraulic or other suitable means.

Extending from frame rails 82a and 82b near the rear 80a of the tilt bed frame are hooks 83 which are adapted to secure the container during transportation. Hooks 83 include a rearwardly facing hook portions 83a which mates with an eye 83b affixed to the container, see FIG. 1. The hook portions 83a engage the eye 83b of container 10 as it is loaded upon the tilt bed frame 80 to control bouncing of the container 10 during transportation.

Also extending from tilt bed frame rails 82a and 82b, spaced there along are support rollers 84 adapted to contact container frame rails 22 and support the container 10. The front end 80b of frame guide rails 82a and 82b include upwardly extending hooks 85a and 85b respectively to act as stops during loading of container 10 onto tilt bed frame 80. Hooks 85a and 85b also serve as front retention means to hold container 10 to tilt bed frame 80 during transportation. Extending outwardly from the tilt bed frame rails 82a and 82b near the front 80b of tilt bed frame 80 are camming surfaces 24 more fully described herein below.

The guide rails 22 of the container 10 extend beyond the front of container 10, forming guide arms 23 which are adapted to engage camming surfaces 24 on tilt bed frame 80. The engagement of the guide arms 23 with camming surfaces 24 provides for accurate alignment of the container 10 upon tilt bed frame 80 during engagement of the container bell mouth female connector with the exhaust gas transfer fitting as described more fully herein below. The camming surface 24 may alternately be mounted on guide rails 22. The camming surfaces 24, typically slightly less than ½ inch in thickness are provided to center the container 10 upon tilt bed frame 80 by providing much closer tolerances between guide rails 22 and tilt bed frame 80 than current industry practice.

Figure 12:
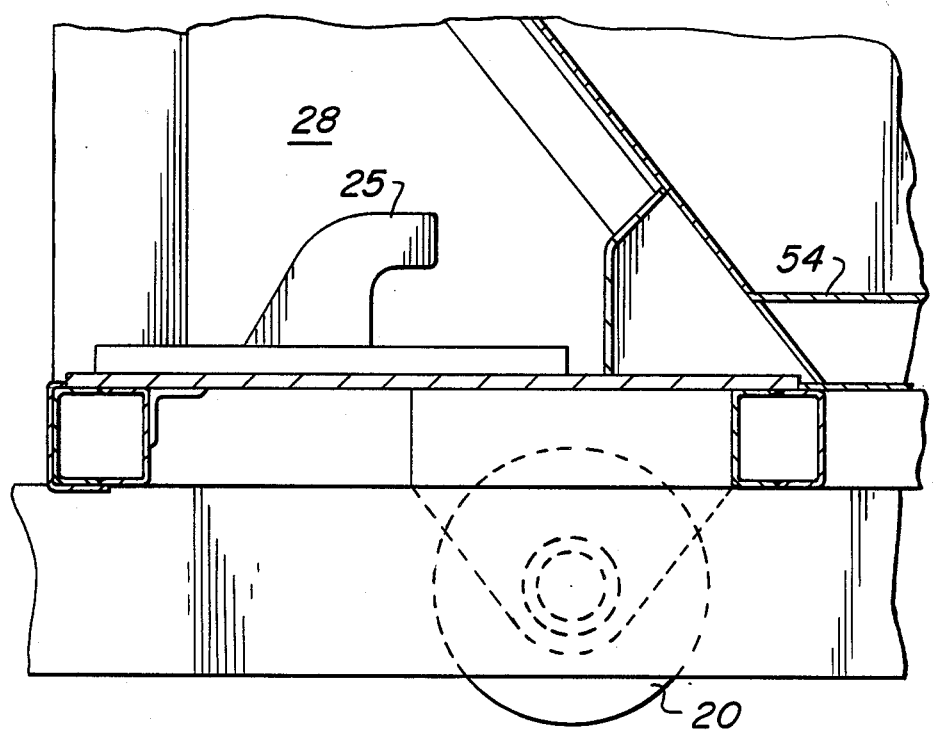
FIG. 12 is a cross-sectional view along line 12—12 of FIG. 2.

The loading and unloading of container 10 from the tilt bed frame 80 is accomplished by a truck mounted cable and winch, not shown, in a manner well known in the art. The cable is attached to container 10 at a hook 25 oriented in a notch 28 extending through the front wall 16 and bottom 18 of container 10 between guide arms 23, see FIG. 12.

Figure 4:
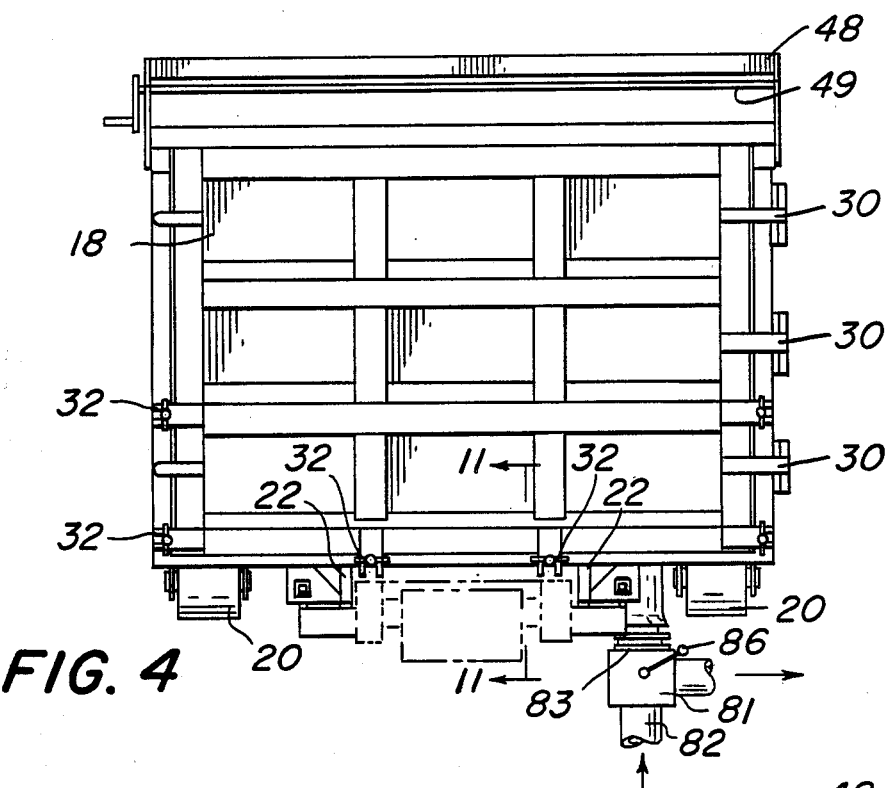
FIG. 4 is a rear elevational view according to the present invention.
Figure 5:
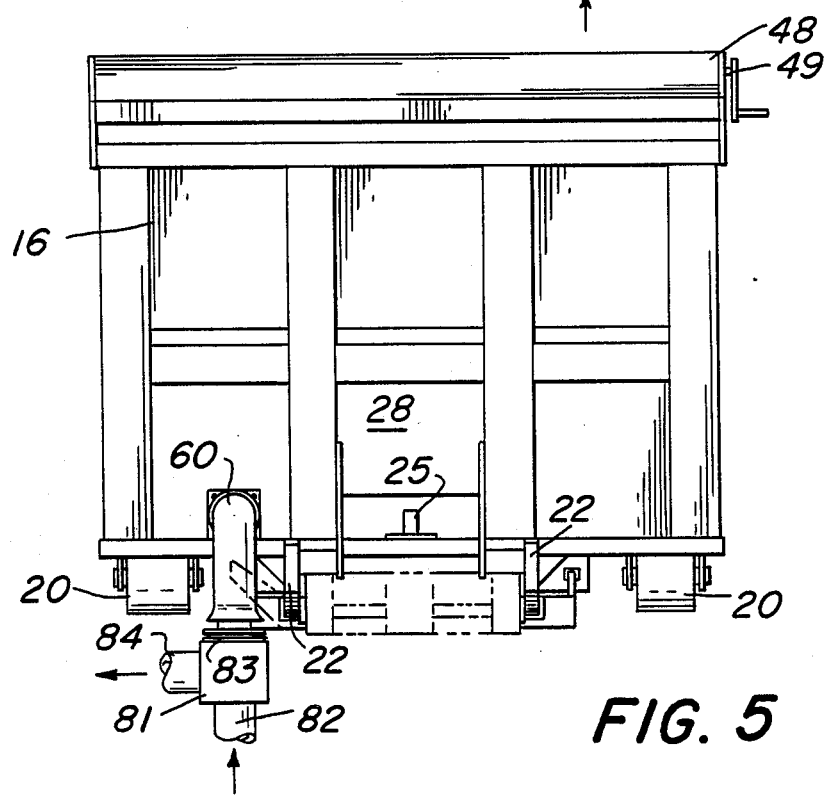
FIG. 5 is a front elevational view according to the present invention.
Figure 11:
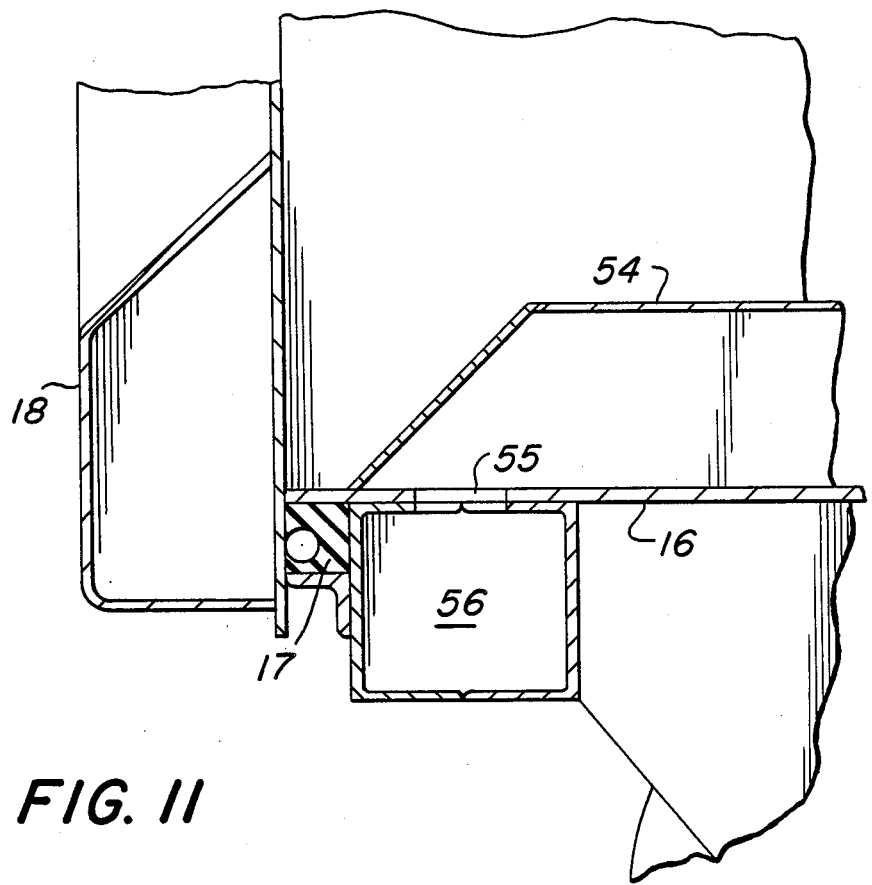
FIG. 11 is a cross-sectional view along line 11—11 of FIG. 4.

The rear door 18 of container 10, FIG. 4, is preferably pivotally mounted at one vertical edge to container side wall 14b by hinges 30. Rear door 18 is fixed in a closed position by suitable locking means of a type well known in the art and sealed by means such as dogs 32 on side wall 14a and bottom 16. An elastomeric seal 17, FIG. 11, is preferably oriented between door 18 and the container 10 to provide a water tight closure. Seal 17 is preferably formed in a "C" shape from a suitable flexible polymer such as neoprene rubber. When pivoted about hinges 30 to an open position, rear door 18 allows dumping of the contents of container 10 by raising of tilt bed frame 80.

Extending between side walls 14a and 14b at the top of container 10 near rear door 18 is a rear splash guard 40. The rear splash guard 40 extends in a longitudinal direction for approximately one-fifth of the overall length of container 10 and is angled slightly downward into the container 10. Rear splash guard 40 controls splashing of the container contents during loading, transporting and dumping of the container. Rear splash guard 40 is preferably angled slightly downward toward the interior of container 10 to control runoff and splashing during loading of container 10.

Figure 9:
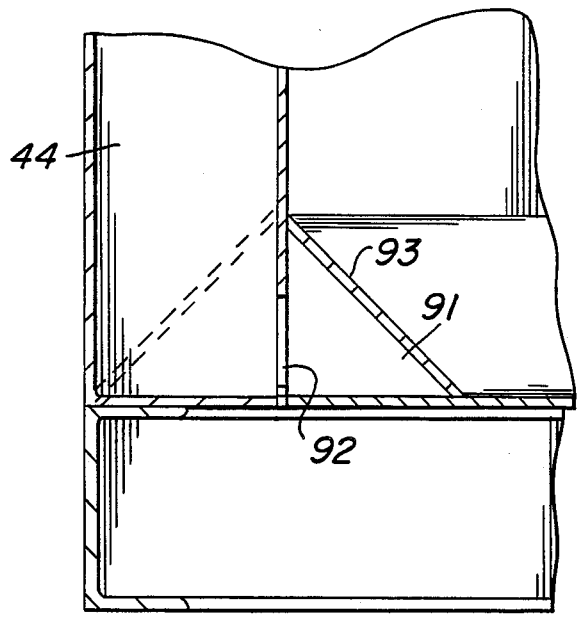
FIG. 9 is a cross-sectional view along line 9—9 of FIG. 1.

As shown in FIG. 1, oriented along side walls 14a and 14b are vertical reinforcing beams 44 and horizontal reinforcing beams 46. The reinforcimg beams 44 and 46 are hollow to provide a duct work system to circulate hot truck exhaust through the walls and floor of container 10 and thereby heat the container 10 and its contents. Suitable openings 92, FIG. 9, are provided to interconnect the hollow beams 44 and ducts 91, described below, into a duct work system for container 10. A bell mouth female connector 50 is provided on the front wall 16 of container 10 and dual exhaust outlets 57 are provided at the rear of container 10 near the top, as the inlet and outlets respectively for the duct work system. Bell mouth female connector 50 preferably has a slightly frusto-conical shape so as to sealingly engage the transfer fitting 60. The hot exhaust gas from the truck enters the container duct work system at connector 50, flows thorugh the hollow beams 44, ducts 91 and ribs 54, described below, and exits at outlets 57 to provide heat to the container contents.

Extending between side walls 14a and 14b adjacent front wall 16 is a front splash guard 94 which preferably extends from front wall 16 longitudinally approximately one-fifth of the length of container 10 to control splashing of the container contents during loading and transportation. Front splash guard 94 is preferably angled slightly downward toward the interior of container 10 to control runoff of materials during loading of refuse or fly ash into container 10.

Also oriented across the top of container 10 adjacent front wall 16 is a cover shield 48. Cover shield 48 protects a cover, not shown, for container 10 when it is rolled up upon roller 47. Cover shield 48 also minimizes flapping of cover 49 during transportation by preventing wind from getting underneath cover 49 at the front edge of container 10.

Figure 2:
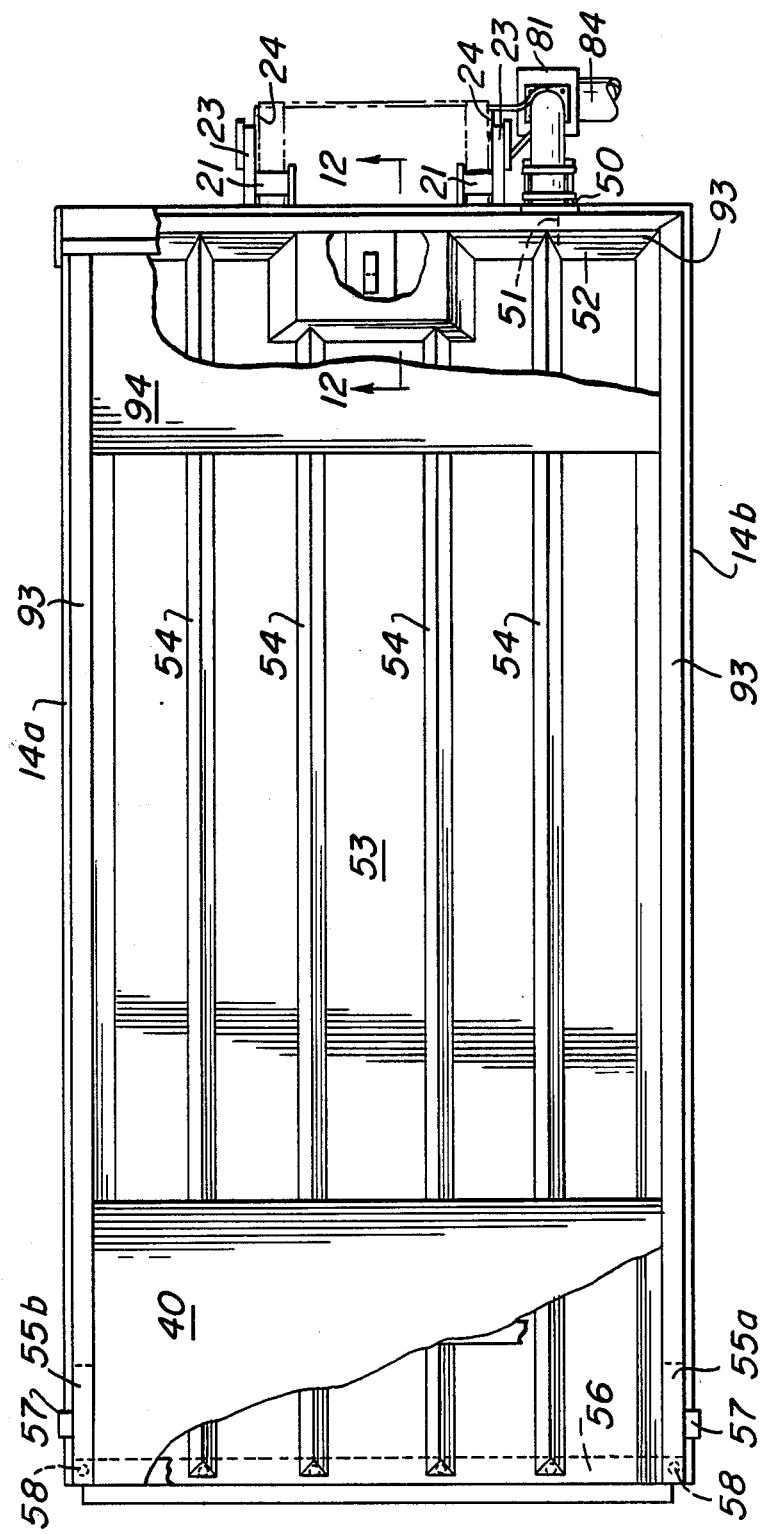
FIG. 2 is a top plan view, partially cut away of a roll-off container showing the present invention.

The front wall 16 of container 10 includes bell mouth female connector 50 which directs hot exhaust gases to a collector area 52, FIG. 2. The collector area 52 is formed integral with the front wall 16 and is interconnected with the duct work system by ducts 91. Ducts 91 are formed at the intersection of the floor 53 and the walls 14a, 14b and 16. Ducts 91 are provided by fixing a plate 93 at an angle between the floor 53 and the walls 14a, 14b and 16 to define a cavity 91, see FIG. 9. The ducts 91 interconnect the collector area 52 with the duct working system through openings such as 92. The orientation of plates 93 also avoids right angle corners in the container 10 where refuse can become stuck.

Figure 10:
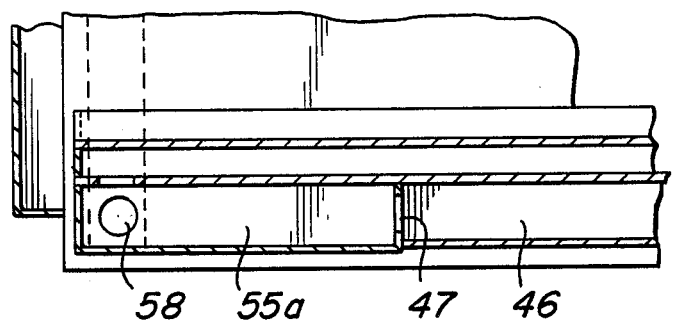
FIG. 10 is a cross-sectional view along line 10—10 of FIG. 1.

The duct work system is formed by the interconnection of hollow vertical, 44, and horizontal 46 reinforcements on side walls 14a and 14b and hollow ribs 54 on the floor 53 of container 10, FIG. 2, with ducts 91. The interior floor or bottom 14 of container 10 is provided with reinforcing ribs 54 on the interior of container 10 which are hollow and interconnected with the duct work system, FIG. 8. Because collector area 52 is oriented adjacent connector 50, FIG. 2, an equalization plate 51, shown in phantom in FIG. 2, is provided to split the incoming exhaust gases approximately ⅔ and ⅓ so that all areas of the duct work system receive approximately equal exhaust gas flow. The hot exhaust gases which enter the duct work system of container 10 flow rearwardly from the inlet at connector 50 to outlets 57 through ducts 91 to hollow reinforcements 44 and 46 hollow ribs 54. At the rear of container 10, the gases from reinforcements 44 and 46 pass through openings 47 to be collected in chambers 55a and 55b, FIG. 10.

The gases from ribs 54 pass through openings 55 into a hollow beam 56 which extends across the rear of container 10 at the floor 53, FIG. 11. From beam 56 the gases pass through holes 58 into chambers 55a and 55b and out through outlets 57, FIG. 10.

The outside of container bottom 12 is provided with reinforcing ribs 13 which angle rearwardly and outwardly from container center line B in a chevron orientation.

Figure 8:
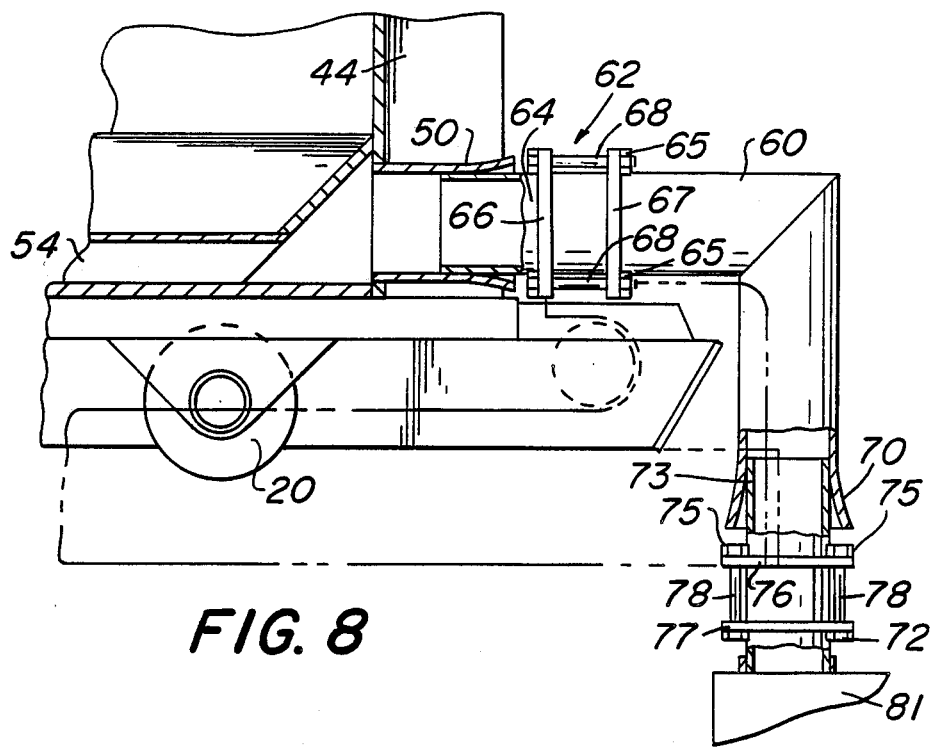
FIG. 8 is a cross-sectional view along line 8—8 of FIG. 5.

Bell mouth female connector 50 is adapted to releasably interconnect with transfer fitting 60. Transfer fitting 60 is mounted to the tilt frame 80 of the truck so as to allow hot exhaust gases from the truck to be diverted from the normal exhaust path and directed into the duct work of the container 10 to heat the contents thereof. Transfer fitting 60 includes a first end 62 adapted to fit snuggly into connector 50 as shown in FIG. 8. Precise alignment between container connector 50 and transfer fitting first end 62 is necessary to minimize exhaust gas leaks and damage to the fittings. The desired precise alignment is provided by contact between the guide arms 23 of container 10 and the alignment cams 24 on the tilt frame rails 82a and 82b. The interaction of container guide rails 22 and tilt bed rails 82 generally aligns the container 10 upon the tilt bed frame 80 within the generally accepted tolerances of ½ inch between guide rails 22 and tile bed rails 82. The clearance desirable between connector 50 and transfer fitting 60 is such that the precision resulting from the use of alignment cams 24 is necessary. As container 10 is pulled onto tilt frame 80 by a winch or hydraulic cylinders, the guide arms 23 and rollers 21 on the tilt bed rails 82 guide and support container 10. As container 10 nears the fully loaded position, precise alignment is provided by alignment cams 24 to insure insertion of first end 62 of transfer fitting 60 into connector 50. Typical industry tolerances of as much as ½ inch of play between container 10 and frame rails 82 would result in misalignment and possible damage to connector 50 and/or transfer fitting 60. The precision alignment provided by alignment cams 24 effectively eliminates such misalignment and wear problems.

As shown in FIG. 8, the first end 62 of transfer fitting 60 is provided with a spring loaded telescopic arrangement to provide a tight seal in spite of slight variances in positioning between tilt beds and containers. The spring loaded fitting comprises an outer end 64 fitted in a telescopic manner over transfer tube 60. Bolts 65 extend between a first plate 66 on outer end 64 and a second plate 67 mounted on transfer tube 60. The bolts 65 limit the separation of the plates 66 and 67. Oriented around bolts 65, between first plate 66 and second plate 67 are springs 68 to urge the telescoping end 64 away from transfer fitting 60. Thus, as the container 10 is pulled onto the tilt bed frame 80 the connector 50 is guided around transfer fitting 60 by the guide rails 23 and also by alignment cams 24. As connector 50 contacts the outer end 64, the biasing springs 68 provide for a sealing contact in the horizontal plane between container 10 and transfer fitting 60.

As shown in FIG. 8, second end 70 of transfer fitting 60 is adapted to interconnect with a segment of the exhaust system of the tilt bed truck. The exhaust system of the truck is provided with a diverter valve 81 which includes an inlet 82 and a first outlet 84 connected to the truck's normal exhaust system. Diverter valve 81 also includes a second outlet 83 adapted to receive the second end 70 of transfer fitting 60. Diverter valve 81 is provided with a lever 82 or other control means to activate diverter valve 81 and direct the hot exhaust gases from inlet 82 either to the normal exhaust system outlet 84 or to the transfer fitting outlet 83 as desired.

The second end 70 of transfer fitting 60 is a second bell mouth female connector adapted to receive a segment 85 of outlet 83 of diverter valve 81. Transfer fitting outlet 83 of diverter valve 81 includes a spring biased, telescoping end 72 to provide a tight interconnection between transfer fitting 60 mounted on the tilt bed frame 80 and the diverter valve 81 mounted to the truck. The spring biased, telescoping end comprises an outer fitting 73 oriented around outlet 83 of diverter valve 81, able to move in a telescoping fashion thereabout. Outer end 73 includes a first plate 76 mounted thereon. A second plate 77 is mounted to the outlet 80. Bolts 75 extend between first plate 76 and second plate 77 to limit separation of the plates 76 and 77. Oriented around bolts 75 between the plates 76 and 77 to urge the outer fitting 73 away from the diverter valve 81 are biasing springs 78.

Thus, as the tilt bed 80 is raised and lowered, interconnection between the transfer fitting 60 and diverter valve 81 is provided. The spring biased, telescoping action of outlet 83 of diverter valve 81 provides for a secure interconnection in the vertical plane with each cycle of raising and lowering the tilt bed 80.

The container 10 is loaded and unloaded in the same manner as conventional, roll-off containers. However, the transfer fitting 60 automatically connects the exhaust system of the truck to the duct work of the container 10 upon loading to allow heating of the load. Heating of the container load is of particular importance in cold weather handling of wet materials. In such conditions, freezing of materials prevents normal dumping of the material through the back door 18 of the container 10.

The interior surfaces of the container may be coated with a high temperature resistant, release material. The material must be resistant to the high temperatures resulting from the circulation of exhaust gases. Exhaust gases typically may reach a temperature of about 470° F. Temperatures within the container duct work system reach approximately 400° F. during normal operations and may be slightly higher in some situations. The desired coating must be resistant to these temperatures and strong enought to resist abrasion and chipping caused by the fly ash during loading and unloading operations. The coating further must present a smooth surface which resists fly ash adhesion. It has been found that a high temperature silicone resin coating such as SC-660 produced by ACX Corporation of Baclif, Tex., is effective. Such coating is applied to a clean surface, such as a sand blasted surface. The coating is preferably applied in a series of layers, for example two light coats which are allowed to partially dry followed by a thicker final coat, so as to provide a smooth covering having a dry film thickness of at least two to three mils. The coating is cured at a temperature of approximately 400° F. by the application of heat from the container duct work system.

It should be understood that the foregoing description and drawings of the invention are not intended to be limiting, but are only exemplary of the inventive features which are defined in the claims.

What is claimed is:

1. An improved roll-off container of the type which is secured to an independent carriage including a source of exhaust gas for transportation thereof, the improvement comprising means to heat the roll-off container and its contents which includes:
   (a) an exhaust gas inlet on said container adapted to receive hot exhaust gases;
   (b) a plurality of ducts formed integral with said container which receive hot gases from said inlet;
   (c) an exhaust gas outlet at a terminus of said ducts; and
   (d) means for aligning said exhaust gas inlet and said source of exhaust gas.

2. The improved roll-off container of claim 1, further including a pivotally mounted rear door to allow dumping of the contents of said container.

3. The improved roll-off container of claim 2, wherein said rear door includes sealing means to provide a substantially water-tight seal when said door is in a closed position.

4. The improved roll-off container of claim 1, further including at least one splash guard oriented across a portion of an open top of said container adjacent one end of said container.

5. The improved roll-off container of claim 4, wherein said splash guard slopes downwardly into said roll-off container.

6. The improved roll-off container of claim 4, wherein said roll-off container includes a splash guard oriented across a portion of an open top of said container adjacent each end of said container.

7. The improved roll-off container of claim 1, including a cover shield oriented across a top front edge of said container to shield a cover retained upon a roller.

8. A heated roll-off container, of the type that is secured to an independent carriage, for transportation thereof, which includes at least two carriage bed rails in a spaced relationship and a source of hot air, said container comprised of:
   (a) a body having at least three side walls and a floor mounted on spaced apart guide rails which cooperate with said carriage bed rails to align said body with said source of hot air;
   (b) an inlet affixed to one of said side walls of said body for receiving hot air from said source;
   (c) a plurality of ducts formed integral with said body which operatively communicate with said inlet; and
   (d) at least one outlet at a terminus of said ducts.

9. A heated roll-off container, of the type that is secured to an independent carriage for transportation thereof, comprising:
   (a) a body having at least three side walls and a floor;
   (b) an inlet, affixed to one of said side walls of said body, for receiving hot air;
   (c) a plurality of ducts which form a duct work system for circulating hot air from said inlet through said side walls and floor of the body;
   (d) at least one outlet at a terminus of said ducts for exhausting hot air from said duct work system; and
   (e) means for aligning said inlet with a source of hot air.

10. An improved tilt bed frame and roll off container combination of the type wherein the tilt bed frame allows for separation of the container from the frame and for on and off loading of the container with respect to the frame, as well as tilting of the container for dumping of the container contents, the improvement comprising:
    (a) heat transfer means on said tilt bed frame for interconnection with and to direct heat to the roll-off container;
    (b) duct means in the periphery of said container to interconnect with said heat transfer means and to distribute heat through the periphery of the container; and
    (c) horizontal alignment means for accurately aligning said container, during loading of the container on said tilt bed frame and interconnection of said duct means and said heat transfer means.

11. The combination of claim 10 wherein said roll-off container further includes a pivotally mounted rear door, which allows dumping of the contents of said container when in an open position, and an elastomeric gasket which provides a substantially water-tight seal when said door is closed.

12. The combination of claim 10 wherein said tilt bed frame and said roll-off container each include at least a pair of parallel longitudinally extending rails which complement each other and said alignment means further comprises camming surfaces oriented between the complementary rails of said frame and said roll-off container.

13. The combination of claim 10 further comprising a diverter means for selectively directing heat to said heat transfer means.

14. The combination of claim 13 wherein said heat transfer means further comprises a first end for releasable interconnection with said diverter means and a second end for releasable interconnection with said roll-off container duct means.

15. The combination of claim 14 wherein each end of said heat transfer means further comprises a limited extension, spring biased, telescoping fitting.

16. The combination of claim 13 wherein said roll-off container is an open top container and further includes at least one splash guard adjacent one end of the container and extending across a portion of the open top.

17. The combination of claim 13 wherein said roll-off container is an open top container and includes a splash guard adjacent each end of said container.

18. The combination of claim 17 wherein each of said splash guards slopes downwardly into said container.

19. The combination of claim 10 wherein the interior surfaces of said roll-off container are coated with a heat resistant release material.

20. The combination of claim 19 wherein said release material comprises a coating of silicone resin having a dry film thickness of at least two mills and resistant to temperatures of at least 400° F.

21. An improved roll-off container and tilt bed frame combination, the improvement comprising means to heat the roll-off container and its contents, said means including:
    (a) heat transfer means mounted on said tilt bed frame;
    (b) duct work dispersed throughout the periphery of said roll-off container terminating in at least one exhaust port and including an inlet for releasably mating with said heat transfer means; and
    (c) orientation means between said tilt bed frame and said roll-off container to align said heat transfer means and said inlet.

22. The combination of claim 21, wherein said container includes a pivotally mounted rear dumping door which is substantially water-tight.

23. The combination of claim 21, wherein said orientation means comprises camming surfaces oriented between rails of said tilt bed frame and rails of said roll-off container.

24. The combination of claim 21 further comprising, a diverter means to selectively direct exhaust gases to said roll-off container when said tilt bed is in a horizontal orientation.

* * * * *